Aug. 30, 1960 B. BIRKENES 2,951,154

RADIO RECEIVER HAVING ANODE POWER OF FRONT-END STAGES DERIVED FROM CATHODE OF OUTPUT STAGE

Filed Oct. 6, 1958

INVENTOR.
Bernhard Birkenes

BY Mueller & Aichele

Attys.

United States Patent Office 2,951,154 Patented Aug. 30, 1960

2,951,154

RADIO RECEIVER HAVING ANODE POWER OF FRONT-END STAGES DERIVED FROM CATHODE OF OUTPUT STAGE

Bernhard Birkenes, Chicago, Ill., assignor to Motorola, Inc., Chicago, Ill., a corporation of Illinois Filed Oct. 6, 1958, Ser. No. 765,375

2 Claims. (Cl. 250—20)

Figure 2:
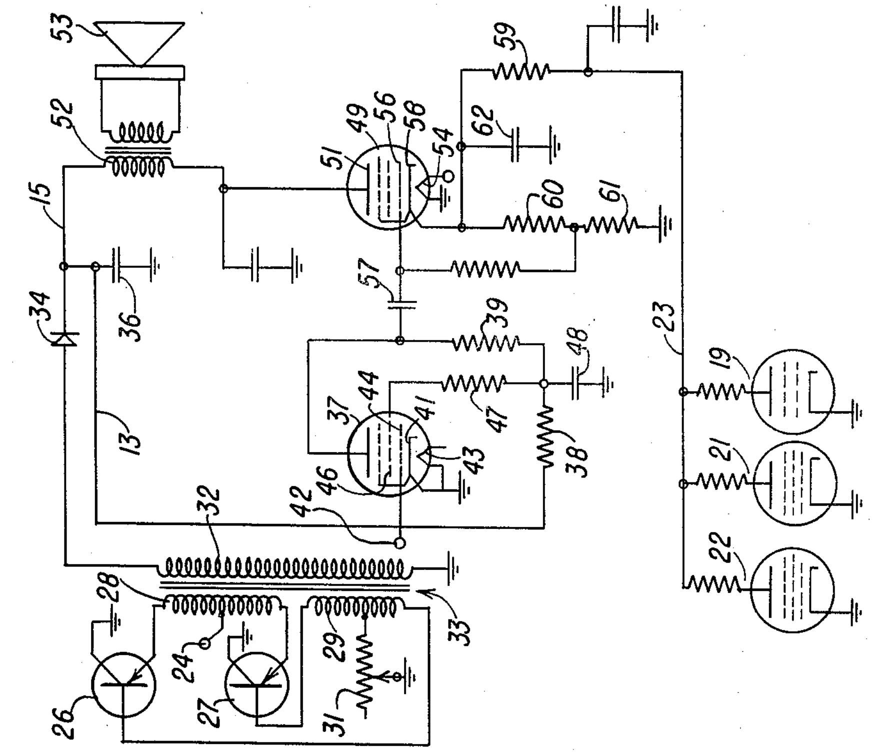

This invention relates to automobile radio receivers and more particularly to radio receivers operable in a vehicle having a relatively low voltage direct current power supply.

In an automobile radio, it is necessary to provide an output signal of sufficient power to overcome background motor noise and still maintain audibility. In general, this requires a relatively high voltage power supply, particularly in radio receivers utilizing vacuum tubes as amplification elements. Although tubes will operate to some extent at a relatively low voltage of the order of six volts, it has been impossible to make a commercially practical auto radio receiver having tubes connected to such a low voltage which will perform adequately. Practical automobile radio receivers utilizing vacuum tubes and one or more transistors are available for operation directly from a 12-volt power source, but for use in automobiles having 6-volt batteries radio receivers require mechanical vibrators or other means for transforming the battery voltage to a higher output voltage satisfactory for operating tubes to provide a practical output level. These receivers have not been entirely satisfactory as vibrators are notoriously unreliable since they are subject to substantial mechanical wear. In addition, they can operate only to provide a relatively low frequency alternating current so that expensive filtering means must be used to obtain a steady high voltage direct current output.

It is an object of the present invention to provide a practical and reliable automobile radio receiver suitable for use in a vehicle having a relatively low voltage power supply of the order of 6 volts.

It is a further object of the invention to provide a relatively inexpensive automobile radio receiver capable of comparatively high level power output.

It is another object of the invention to provide an automobile radio receiver using a minimum amount of power while still delivering an output signal sufficiently powerful to be audible within an operating vehicle.

A feature of the present invention is a transistor oscillator circuit for converting relatively low voltage direct current to alternating current, which is transformed and rectified to a relatively high voltage direct current output suitable for operating the power output tube of an automobile radio receiver to produce a commercially acceptable output signal. A relatively high frequency is used so that relatively inexpensive filter means can be employed in filtering its transformed and rectified output.

A further feature of the invention is the provision of a radio receiver having a transistor oscillator power supply with the space current paths of the tubes connected in series parallel to provide efficient energization of the receiver.

Another feature of the invention is the provision of an automobile radio receiver having the power output tube energized from a high voltage system, and with tubes of other stages of the receiver energized by the voltage developed across resistance in the cathode circuit of the output tube thus decreasing the power consumption of the receiver and simplifying its design.

Figure 1:
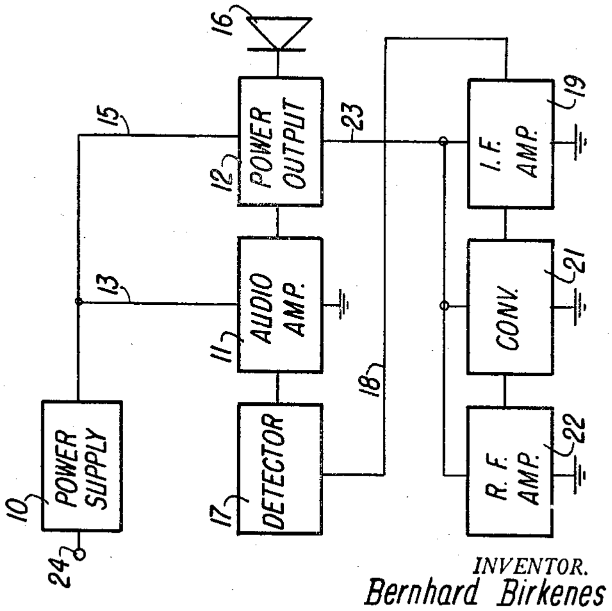

In the accompanying drawings:

Fig. 1 is a block diagram of a radio receiver in accordance with the present invention; and Fig. 2 is a simplified circuit diagram of the receiver illustrated in Fig. 1.

In accordance with the present invention, an automobile radio receiver includes an audio amplifier tube and a power output tube both supplied with a relatively high voltage direct current potential. This current is supplied by a push-pull or single transistor oscillator connected to a 6-volt automobile battery. The oscillator converts the low voltage direct current to a high frequency alternating current which is passed through a step-up transformer, rectified and filtered to provide a high voltage direct current output. Because the oscillator operates at a much higher frequency than a conventional mechanical vibrator, relatively simple and inexpensive filtering means can be used for the transformer output. The cathode of the power output tube is coupled to the anodes of the radio frequency and intermediate frequency amplifier tubes of the receiver so that the tubes are energized in series. In this way the over-all power consumption of the receiver is reduced and its design simplified. At the same time, the receiver is capable of providing an output signal of sufficient power to render it suitable as an automobile radio receiver, while at the same time being powered from a low voltage power source and avoiding the use of unreliable mechanical vibrators or the like.

The block diagram of the reecive in Fig. 1 shows the power supply 10 coupled to audio amplifier stage 11 and power output stage 12 through the conductors 13 and 15. A loudspeaker 16 is shown connected to the power amplifier. A detector stage 17 is connected through the signal channel 18 to the intermediate frequency amplifier stage 19, the converter stage 21 and the radio frequency amplifier stage 22. Each of these stages includes a vacuum tube and is generally conventional in its internal design. The stages shown are coupled to the power amplifier 12 through the conductor 23.

The power supply stage is provided with an input terminal 24 which is adapted to be coupled to a low voltage power source not shown. This power source supplies a relatively low voltage direct current and in accordance with the present invention may be a 12-volt or a 6-volt battery of the type included in an automobile.

As shown in Fig. 2, the power supply 10 includes p-n-p transistors 26 and 27 each with grounded collectors and having their emitters connected to opposite ends of the winding 28 to which the input terminal 24 is connected for supplying low voltage direct current. The base electrodes of the transistors 26 and 27 are coupled to opposite ends of the winding 29 which is tapped by the variable resistor 31 to provide balance between the two transistors. Transistors 26 and 27 are thus connected as a push-pull amplifier and convert the direct current applied at input terminal 24 to a high frequency pulsating current which, in accordance with a particular embodiment of the invention, has a frequency of 5,000 cycles per second. The winding 32 forms a secondary winding of the transformer indicated generally at 33 and has induced in it a pulsating current of increased voltage which is applied to the rectifier 34 and is filtered by the grounded capacitor 36. The high frequency of the pulsating current delivered by the transistor oscillator makes possible the use of this relatively simple and inexpensive capacitor filtering means. In one embodiment of the invention, the power supply which includes the transistor oscillator, the transformer 33 and the rectifier 34 converts the 6-volt direct current applied at terminal 24 to a 250-volt direct current across capacitor 36.

The audio amplifier section 11 includes the pentode vacuum tube 37 having its plate coupled to the power conductor 13 through the serially connected dropping resistors 38 and 39. Grid 41 of this tube is coupled to the detector stage 17 through the terminal 42. The tube is also provided with a heater 43, energized from the 6-volt power source, and the cathode 44 is grounded. The screen grid 46 is connected to the power supply through resistor 47 and is by-passed by capacitor 48.

The power output stage 12 includes the pentode vacuum tube 49 whose place 51 is coupled to the high voltage power conductor 15 through the primary winding of transformer 52 which is connected to the loudspeaker 53. The tube 49 is provided with a 6-volt heater 54. Grid 56 is connected to the audio amplifier stage 37 through the coupling capacitor 57. The cathode 58 is connected to ground through resistors 60 and 61 which are by-passed by capacitor 62.

The voltage across resistors 60 and 61, connected to the cathode 58 of tube 49, is utilized to energize the tubes 19, 21 and 22, being applied thereto through the resistor 59 and conductor 23. The voltage drop across the power tube 49 is substantial so that the voltage applied through conductor 23 is, in the particular embodiment described, of the order of 30 volts. This potential is adequate for operation of the tubes of the intermediate frequency amplifier 19, the converter 21 and the radio frequency amplifier 22. Operation of these stages at relatively low voltage reduces the overall power consumption of the receiver. However, in accordance with the present invention, vacuum tubes 37 and 49, which provide the output signal for the loudspeaker 53 are operated at 250 volts to produce a signal which is clearly audible in a vehicle at the high noise level present during its operation.

The present invention thus provides a relatively simple and inexpensive, yet effective and commercially practical, auto radio receiver. The use of the transistor oscillator permits the use of a relatively low voltage storage battery in the order of 6-volts to operate the receiver without the necessity of using a costly and unreliable mechanical vibrator. This enables the low voltage direct current to be conveniently transformed and rectified to a high voltage direct current which enables the audio amplifier and power output tubes to operate at high voltage and deliver adequate power for commercially successful operation. Connection of the cathode of the power output tube to the other stages of the receiver so that the space charge paths of the tubes are connected in a series-parallel current greatly reduces the overall power consumption and simplifies the design.

I claim:

1. A superheterodyne radio receiver for use in an automobile having an electrical system providing a potential of the order of six volts, including in combination, a power oscillator circuit adapted to be energized by the electrical system, said power oscillator circuit including a step-up transformer and a rectifier circuit to produce a direct current energizing potential for said receiver, audio amplifier circuit means including a power output vacuum tube having grid, cathode and anode electrodes, a loudspeaker circuit coupling said anode electrode to said rectifier circuit, a direct current voltage divider coupled between said cathode electrode and a reference point, said direct current energizing potential providing power to said audio amplifier circuit means such that signals applied to said grid electrode will produce output sound from said receiver which is at a level to be heard in the automobile, means including a detector stage for demodulating signals and applying such signals to said grid electrode, a plurality of receiver stages including stages for heterodyning and amplifying received signals and for applying such signals to said detector stage, said receiver stages having respective amplifying devices therein, energization circuit means coupling said amplifying devices in parallel and filter circuit means coupled to said direct current voltage divider and said energization circuit means so that energization for said receiver stages is derived from said audio amplifier circuit means.

2. A superheterodyne radio receiver for use in an automobile having an electrical system providing a potential of the order of six volts, including in combination, a transistorized power oscillator circuit adapted to be energized by the electrical system and including a step-up transformer and a rectifier circuit to produce a direct current energizing potential, audio amplifier circuit means having a first amplifier tube including means coupling the same to said rectifier circuit to be energized thereby, said amplifier circuit means also including a power output tube having grid, cathode and anode electrodes, a resistor-capacitor audio signal coupling network connected between said first tube and said output tube for applying signals to the latter, a loudspeaker circuit coupled between said anode electrode and said rectifier circuit, a direct current voltage divider coupled between said cathode electrode and the reference point, said direct current energizing potential providing power to said audio amplifier circuit means such that signals applied to said grid electrode will produce output sound from said receiver which is at a level to be heard in the automobile, means including a detector stage for demodulating signals and applying such signals to said first amplifier tube, a plurality of receiver stages including stages for heterodyning and amplifying received signals and for applying such signals to said detector stage, said receiver stages having respective amplifying tubes therein, and a plurality of energization circuit portions coupling said amplifying tubes individually across said direct current voltage divider so that energization for such receiver stages is derived through said power output tube.

References Cited in the file of this patent

UNITED STATES PATENTS

| | | |
|---|---|---|
| 1,814,158 | Holden | July 14, 1931 |
| 2,812,393 | Patrick | Nov. 5, 1957 |
| 2,837,651 | Schultz | June 3, 1958 |

OTHER REFERENCES

Publication: Riders TV Manual, vol. 7, only two pages cited: "Crosley TV, page 7–10"; "Crosley TV, page 7–11."